(12) United States Patent
Tennyson et al.

(10) Patent No.: US 8,369,485 B2
(45) Date of Patent: Feb. 5, 2013

(54) METHODS, APPARATUS, AND ARTICLES OF MANUFACTURE TO TRIGGER PREEMPTIVE MAINTENANCE IN VECTORED DIGITAL SUBSCRIBER LINE (DSL) SYSTEMS

(75) Inventors: Gary Tennyson, Pelham, AL (US); Richard D. Hart, Concord, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 236 days.

(21) Appl. No.: 12/962,397

(22) Filed: Dec. 7, 2010

(65) Prior Publication Data

US 2012/0140901 A1   Jun. 7, 2012

(51) Int. Cl.
*H04M 1/24* (2006.01)
*H04M 3/08* (2006.01)
*H04M 3/22* (2006.01)

(52) U.S. Cl. ............... 379/9.03; 379/1.01; 379/1.04; 379/22.03; 379/22.08

(58) Field of Classification Search ............ 379/1.01, 379/1.03, 1.04, 9, 9.02, 9.03, 9.04, 9.06, 379/14.01, 10.01, 12, 15.05, 22.03, 22.07, 379/22.08, 27.01, 29.01, 34.04
See application file for complete search history.

(56) References Cited

U.S. PATENT DOCUMENTS

| | | | |
|---|---|---|---|
| 5,920,846 A * | 7/1999 | Storch et al. | ............... 705/7.14 |
| 7,092,435 B2 | 8/2006 | Saruwari | |
| 7,158,563 B2 | 1/2007 | Ginis et al. | |
| 7,302,379 B2 | 11/2007 | Cioffi et al. | |
| 7,397,871 B2 | 7/2008 | Wiss et al. | |
| 7,606,350 B2 | 10/2009 | Cioffi et al. | |
| 7,711,530 B2 | 5/2010 | Cioffi et al. | |
| 7,769,100 B2 | 8/2010 | Cheong et al. | |
| 7,773,497 B2 | 8/2010 | Cioffi et al. | |
| 7,774,398 B2 | 8/2010 | Cioffi et al. | |
| 7,809,116 B2 | 10/2010 | Rhee et al. | |
| 8,027,807 B2 * | 9/2011 | May et al. | ............... 702/183 |
| 8,144,835 B2 * | 3/2012 | Wu et al. | ............... 379/1.04 |
| 8,208,519 B2 * | 6/2012 | Belge et al. | ............... 375/222 |
| 2003/0086362 A1 | 5/2003 | Hasegawa et al. | |
| 2003/0086514 A1 | 5/2003 | Ginis et al. | |
| 2005/0152385 A1 | 7/2005 | Cioffi | |
| 2005/0195892 A1 | 9/2005 | Ginis et al. | |

(Continued)

FOREIGN PATENT DOCUMENTS

WO   2007146048   12/2007

OTHER PUBLICATIONS

Ginis et al., "Vectored DSL to the Rescue," OSP Magazine, Mar. 2010. (4 pages).

(Continued)

*Primary Examiner* — Binh Tieu
(74) *Attorney, Agent, or Firm* — Hanley, Flight and Zimmerman, LLC

(57) ABSTRACT

Example methods, apparatus, and articles of manufacture to trigger preemptive maintenance of vectored digital subscriber line (DSL) systems are disclosed. An example method includes obtaining a value representing crosstalk coupling between a first subscriber loop and a second subscriber loop, the first and second subscriber loops belonging to a vectored DSL group of subscriber loops, determining whether to automatically perform a diagnostic test on the first subscriber loop based on the value, submitting a trouble ticket for the first subscriber loop based on a result of the diagnostic tests, and generating a maintenance report for the vectored DSL group based on the value and the results.

20 Claims, 4 Drawing Sheets

U.S. PATENT DOCUMENTS

| | | |
|---|---|---|
| 2005/0259725 A1 | 11/2005 | Cioffi |
| 2006/0114977 A1 | 6/2006 | Ginis et al. |
| 2006/0198430 A1 | 9/2006 | Rhee et al. |
| 2006/0268733 A1 | 11/2006 | Rhee et al. |
| 2006/0274825 A1 | 12/2006 | Cioffi et al. |
| 2006/0274893 A1 | 12/2006 | Cioffi et al. |
| 2006/0276918 A1 | 12/2006 | Cioffi et al. |
| 2006/0280236 A1 | 12/2006 | Rhee et al. |
| 2006/0280237 A1 | 12/2006 | Rhee et al. |
| 2006/0280238 A1 | 12/2006 | Cioffi et al. |
| 2007/0036339 A1 | 2/2007 | Cioffi et al. |
| 2007/0036340 A1 | 2/2007 | Rhee et al. |
| 2007/0263711 A1 | 11/2007 | Kramer et al. |
| 2007/0274404 A1 | 11/2007 | Papandriopoulos et al. |
| 2009/0074153 A1* | 3/2009 | Wu et al. ............... 379/1.04 |
| 2009/0147666 A1 | 6/2009 | Fang et al. |
| 2009/0225672 A1* | 9/2009 | Yi et al. ................. 370/252 |
| 2010/0034374 A1 | 2/2010 | Ohman et al. |
| 2011/0058468 A1* | 3/2011 | Singh et al. ............ 370/201 |
| 2012/0134397 A1* | 5/2012 | Cioffi et al. ............ 375/222 |

OTHER PUBLICATIONS

Ginis, "Management of Vectored DSL," Globecom 2009, Access Business Forum. (15 pages).

Ginis et al., "The effects of Vectored DSL on Network Operations," Journal of Telecommunications Management, vol. 3, No. 2, Jul. 2010, pp. 107-117. (13 pages).

* cited by examiner

METHODS, APPARATUS, AND ARTICLES OF MANUFACTURE TO TRIGGER PREEMPTIVE MAINTENANCE IN VECTORED DIGITAL SUBSCRIBER LINE (DSL) SYSTEMS

FIELD OF THE DISCLOSURE

This disclosure relates generally to vectored digital subscriber line (DSL) systems and, more particularly, to methods, apparatus, and articles of manufacture to trigger preemptive maintenance of vectored DSL systems.

BACKGROUND

Vectored DSL is an emerging DSL technology that offers significant improvements in transmission rates over ordinary telephone lines. In a vectored DSL communication system, a vectoring engine uses collected measurements characterizing crosstalk between a set of subscriber lines to reduce the crosstalk noise experienced by those subscriber lines.

DETAILED DESCRIPTION

Example methods, apparatus, and articles of manufacture to trigger preemptive maintenance of vectored digital subscriber line (DSL) systems are disclosed. A disclosed example method includes obtaining a value representing crosstalk coupling between a first subscriber loop and a second subscriber loop, the first and second subscriber loops belonging to a vectored DSL group of subscriber loops, determining whether to automatically perform a diagnostic test on the first subscriber loop based on the value, submitting a trouble ticket for the first subscriber loop based on a result of the diagnostic tests, and generating a maintenance report for the vectored DSL group based on the value and the results.

A disclosed example apparatus includes a data analysis module, a diagnostic testing module, a trouble ticket submitter, and a report generator. The data analysis module is to determine whether to automatically initiate a diagnostic test on a first subscriber loop based on a value representing crosstalk coupling between the first subscriber loop and a second subscriber loop, the first and second subscriber loops belonging to a vectored DSL group of subscriber loops. The diagnostic testing module is to implement the diagnostic test. The trouble ticket submitter is to submit a trouble ticket for the first subscriber loop based on a result of the diagnostic test. The report generator is to generate a maintenance report for the vectored DSL group based on the value and the result.

Figure 1:
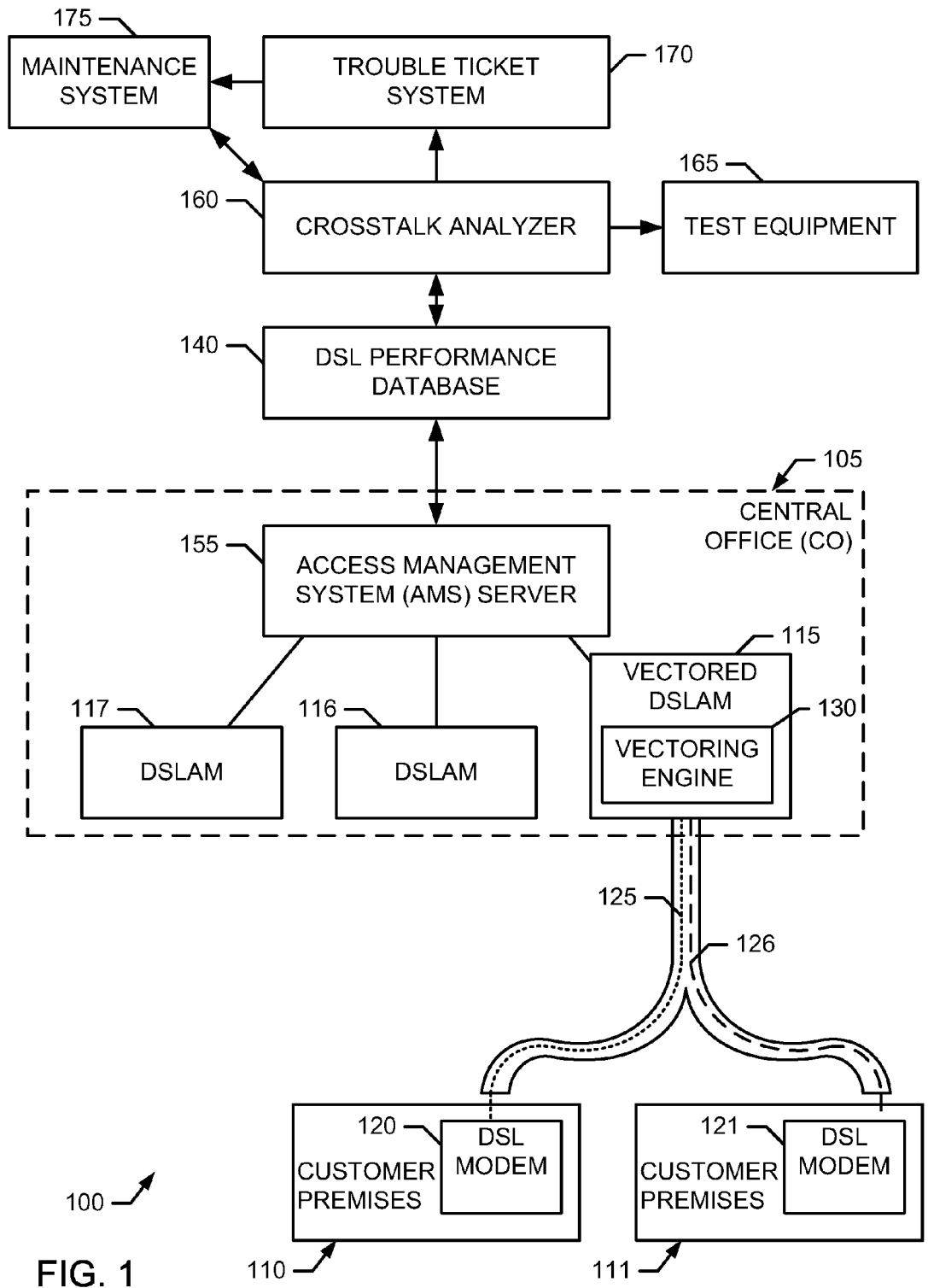
FIG. 1 is a schematic illustration of an example vectored DSL system constructed in accordance with the teachings of this disclosure.

FIG. 1 illustrates an example vectored DSL system 100. The example vectored DSL system 100 of FIG. 1 includes any number and/or type(s) of central offices (COs), one of which is designated at reference numeral 105, remote terminals (RTs) and/or serving area interfaces (SAIs). The example CO 105 of FIG. 1, and/or other COs, RTs and/or SAIs are used to provide data and/or communication services to one or more customer premises, two of which are designated at reference numerals 110 and 111. The example customer premises 110 and 111 of FIG. 1 are at different, but possibly nearby, geographic locations (e.g., different residential homes, different apartments, different condominiums, different hotel and/or motel rooms, and/or different businesses). Moreover, even though two customer premises 110 and 111 may be, for example, located within the same building (e.g., apartments), they will be considered herein as different customer premises. Example data and/or communication services include, but are not limited to, telephone services, Internet services, data services, messaging services, instant messaging services, electronic mail (email) services, chat services, video services, audio services, gaming services. To provide DSL communication services to the customer premises 110-111, the example CO 105 of FIG. 1 includes any number and/or type (s) of DSL access multiplexers (DSLAMs), three of which are designated at reference numerals 115, 116 and 117, and the example customer premises 110-111 include any type(s) of customer premises equipment (CPE) DSL modems 120 and 121. The example DSLAM 115 of FIG. 1 includes and/or implements one or more CO DSL modems (not shown) for respective ones of the customer premises 110-111. CO DSL modems are sometimes referred to in the industry as "DSLAM ports" or simply "ports." The example DSLAMs 115-117, the CO DSL modems within the DSLAMs 115-117, and/or the example CPE DSL modems 120-121 of FIG. 1 may be implemented, for example, in accordance with the International Telecommunications Union—Telecommunications Sector (ITU-T) G.993.x family of standards for very high-speed DSL (VDSL), and/or the ITU-T G.992.x family of standards for asymmetric DSL (ADSL). However, the CO DSL modems and/or the CPE DSL modems 120-121 may be implemented in accordance with any past, present and/or future standard, specification and/or recommendation.

While in the illustrated example of FIG. 1 the DSLAMs 115-117 are implemented at the CO 105, any of the DSLAMs 115-117 may be, additionally or alternatively, implemented at an RT, at an SAI and/or at any other location between the CO 105 and the customer premises 110-111. In such instances, a fiber-optic cable (not shown) may be used, for example, to communicatively couple the remotely located DSLAMs 115-117 to the CO 105.

In the illustrated example of FIG. 1, the DSLAM 115 provides DSL services to the CPE DSL modems 120-121 via respective subscriber loops 125 and 126. Subscriber loops are sometimes also referred to in the industry as "wire-pairs", "subscriber lines" and/or "loops." While throughout this disclosure reference is made to the example subscriber loops 125-126 of FIG. 1, a subscriber loop (e.g., any of the example subscriber loops 125-126) used to provide a DSL service to a customer premises (e.g., any of the customer premises 110-111) may include and/or be constructed from one or more segments of copper twisted-pair wire (e.g., any combination of a feeder one (F1) cable, a feeder two (F2) cable, a feeder three (F3) cable, a feeder four (F4) cable, a distribution cable, a drop cable, and/or customer premises wiring), terminals, and/or distributions points (e.g., an RT, an SAI, a serving terminal, a vault, a pedestal and/or any other type(s) of wiring distribution points). Such segments of copper twisted-pair wire may be spliced and/or connected end-to-end, and/or may be connected at only one end, thereby creating one or more bridged-taps. Regardless of the number, type(s), gauge(s) and/or topology of copper twisted-pair wires used to construct the example subscriber loops 125-126, they will be referred to herein in the singular form, but it will be understood that the term "loop" may refer to one or more copper twisted-pair wire segments and may include one or more bridged taps.

The example subscriber loops 125-126 of FIG. 1 are a part of the same cable binder and, thus, are in the same binder group. Multiple wire pairs sharing the same cable binder, such as the example subscriber loops 125-126, may cause crosstalk, or electromagnetic coupling, into each other. The noise that results from crosstalk coupling between copper twisted-pair wires, such as the example subscriber loops 125-126, may reduce data transmission rates. Vectored DSL technology, using advanced signal processing, is able to mitigate the crosstalk effects that may cause performance problems for DSL lines. The crosstalk coupling values gathered by vectored DSL technology can be used to identify potential problems in a binder or vectored DSL group. For example, excessive crosstalk coupling values might indicate a potential problem on one of the example subscriber loops 125, 126.

In the illustrated example of FIG. 1, the example DSLAM 115 implements a vectoring engine 130. The example vectoring engine 130 of FIG. 1 measures crosstalk coupling between loops in a binder or vectored DSL group, such as, for example, the subscriber loops 125-126, and works to mitigate the crosstalk coupling. The example methods, apparatus, and article of manufacture disclosed herein utilize values representative of the crosstalk coupling measured by the vectoring engine 130 to proactively monitor and/or analyze subscriber loops of a vectored DSL group, and/or to automatically trigger maintenance of the subscriber loop(s) 125-126 and/or the vectored DSL group based on this analysis.

To store, among other data, the measured crosstalk coupling values, the example vectored DSL system 100 of FIG. 1 includes a DSL performance database 140. The crosstalk coupling values may be stored in the example DSL performance database 140 of FIG. 1 using any number and/or type(s) of data structures. The example DSL performance database 140 may be implemented by any number and/or type(s) of volatile and/or non-volatile memory(-ies), memory device(s), and/or storage device(s).

To obtain the crosstalk coupling values associated with the example subscriber loops 125-126, the vectored DSL system 100 of FIG. 1 includes an access management system (AMS) server 155. The example AMS server 155 of FIG. 1 obtains crosstalk coupling values measured by the vectoring engine 130 from the DSLAM 115 using any number and/or type(s) of application programming interface (API), and stores the crosstalk coupling values in the DSL performance database 140.

To proactively identify potentially faulty subscriber loops, the example vectored DSL system 100 of FIG. 1 includes a crosstalk analyzer 160. The example crosstalk analyzer 160 of FIG. 1 accesses the crosstalk coupling values stored in the example DSL performance database 140 via any number and/or type(s) of API. Based on the obtained crosstalk coupling values, the example crosstalk analyzer 160 of FIG. 1 automatically determines whether additional diagnostic testing, trouble shooting, and/or maintenance should be performed for a particular subscriber loop 125, 126. For each of the subscriber loops 125-126, the example crosstalk analyzer 160 periodically or aperiodically queries the example DSL performance database 140 to obtain values that represent the crosstalk coupling between that subscriber loop 125, 126 and other subscriber loops belonging to the same vectored DSL group as the subscriber loop 125, 126. The crosstalk analyzer 160 compares the crosstalk coupling values with a threshold value to determine whether one or more diagnostic tests should be performed on the presently considered subscriber loop 125, 126. An example threshold value represents a maximum expected crosstalk coupling for subscriber loops without a potential fault. An example manner of implementing the example crosstalk analyzer 160 of FIG. 1 is described below in connection with FIG. 4. An example process that may be carried out to implement the example crosstalk analyzer 160 is described below in connection with FIG. 5.

By proactively monitoring crosstalk coupling between the example subscriber loops 125-126 of FIG. 1, the example crosstalk analyzer 160 of FIG. 1 provides a number of benefits to an operator of the example vectored DSL system 100. For example, by proactively identifying subscriber loops 125-126 that are exhibiting excessive levels of crosstalk, the example crosstalk analyzer 160 can facilitate the timely and efficient resolution of identified problems prior to receiving a customer trouble report and/or without interrupting the customer's service.

When the example crosstalk analyzer 160 of FIG. 1 identifies a subscriber loop 125, 126 as exhibiting an excessive amount of crosstalk coupling, the example crosstalk analyzer 160 automatically performs one or more diagnostic tests on the particular subscriber loop 125, 126 using any number and/or type(s) of test equipment 165. Based on results of the diagnostic test(s), the crosstalk analyzer 160 determines whether to generate and/or submit a trouble ticket to any type of trouble ticket system 170. Such an automatically generated and/or submitted trouble ticket represents preventative, prospective, forecasted and/or projected maintenance needs that could/should be performed in order to, for example, reduce the likelihood or probability that a service problem will be reported by a customer and/or reduce the likelihood or probability that a customer's service will be interrupted. In response to the submitted trouble ticket, an appropriate service and/or maintenance technician can be dispatched to diagnose, troubleshoot, and/or rectify the cause(s) of the excessive crosstalk coupling associated with the presently considered subscriber loop 125, 126.

Additionally, based on the diagnostic test(s), the example crosstalk analyzer 160 determines whether crosstalk analyses are to be performed on other subscriber loops in the vectored DSL group associated with the subscriber loops 125-126. Once the crosstalk analyses have been performed on the additional subscriber loops, the crosstalk analyzer 160 generates a maintenance report for the vectored DSL group based on the crosstalk coupling values and the results of the diagnostic test(s). The information in the trouble tickets and/or maintenance reports associated with the subscriber loops 125-126 and any other subscriber loops in the vectored DSL group may be presented and/or accessed by a maintenance system 175 via, for example, a web-based graphical user interface (GIU) and/or a web-based dashboard.

Figure 2:
FIG. 2 illustrates an example trouble ticket that may be generated by the example crosstalk analyzer of FIG. 1.

FIG. 2 illustrates an example trouble ticket 200 that may be generated by the example crosstalk analyzer 160 to present diagnostic test results associated with a subscriber loop, such as, for example, the subscriber loop 125. To identify the subscriber loop 125, the example trouble ticket 200 of FIG. 2 includes an identifier field 210. The example identifier field 210 of FIG. 2 contains one or more values, letters and/or strings that uniquely identify the subscriber loop 125.

To identify the port associated with the subscriber loop 125, the example trouble ticket 200 of FIG. 2 includes a port identifier field 215. The example port identifier field 215 of FIG. 2 contains one or more values, letters and/or strings that uniquely indentify a particular port associated with the subscriber loop 125.

To identify the customer associated with the subscriber loop 125, the example trouble ticket 200 of FIG. 2 includes a customer identifier field 220. The example customer identifier field 220 of FIG. 2 contains one or more values, letters and/or strings that uniquely indentify a particular customer associated with the subscriber loop 125.

To store the diagnostic test results, the example trouble ticket 200 of FIG. 2 includes a test results field 225. The example test results field 225 of FIG. 2 contains one or more diagnostic test results associated with the subscriber loop 125 represented by the corresponding identifier field 210.

While an example trouble ticket 200 that may be generated and/or presented by the example crosstalk analyzer 160 of FIG. 1 is illustrated in FIG. 2, the example trouble ticket 200 may be implemented using any number and/or type(s) of other and/or additional entries, fields and/or data. Further, the entries, fields and/or data illustrated in FIG. 2 may be combined, divided, re-arranged, eliminated and/or implemented in any way. Further still, a trouble ticket may include entries, fields and/or data in addition to, or instead of, those illustrated in FIG. 2, and/or may include more than one of any or all of the illustrated entries, fields and/or data.

Returning to FIG. 1, to manage trouble tickets, the example vectored DSL system 100 of FIG. 1 includes the example trouble ticket system 170. The example trouble ticket system 170 of FIG. 1 implements any number and/or type(s) of APIs via which the example crosstalk analyzer 160 can submit a trouble ticket. The example trouble ticket system 170 also routes a submitted trouble ticket to a suitable repair, customer support and/or technical support person of the example maintenance system 175 for resolution, and tracks the resolution of trouble tickets.

Figure 3:
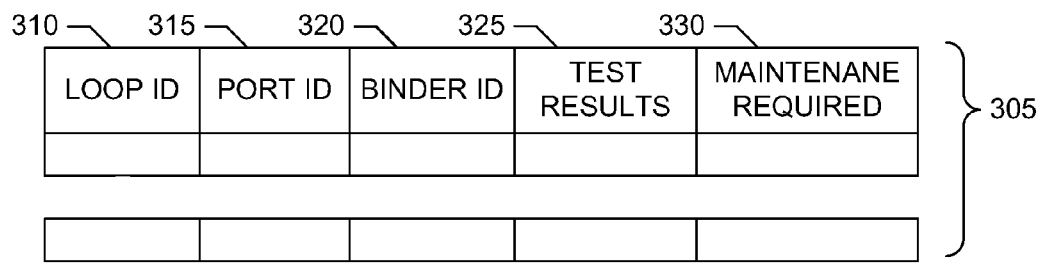
FIG. 3 illustrates an example maintenance report that may be generated by the example crosstalk analyzer of FIG. 1.

FIG. 3 illustrates an example maintenance report 300 that may be generated by the example crosstalk analyzer 160 to present test results and identified potential maintenance for the vectored DSL group associated with the subscriber loops 125-126. The example maintenance report 300 of FIG. 3 includes a plurality of entries 305 for respective ones of a plurality of subscriber loops 125-126 and any other subscriber loops in the vectored DSL group that were analyzed by the example crosstalk analyzer 160 and identified as potentially requiring maintenance. To identify a subscriber loop 125-126, each of the example entries 305 of FIG. 3 includes an identifier field 310. Each of the example identifier fields 310 of FIG. 3 contains one or more values, letters and/or strings that uniquely identify a particular subscriber loop 125-126.

To identify the port associated with the subscriber loops 125-126, each of the example entries 305 of FIG. 3 includes a port identifier field 315. Each of the example port identifier fields 315 of FIG. 3 contains one or more values, letters and/or strings that uniquely indentify a particular port associated with a particular subscriber loop 125-126.

To identify the vectored DSL group or binder cable that contains the subscriber loops 125-126, each of the example entries 305 of FIG. 3 includes a binder identifier field 320. Each of the example binder identifier fields 320 of FIG. 3 contains one or more values, letters and/or strings that uniquely indentify a particular binder cable associated with a particular subscriber loop 125-126.

To store diagnostic test results, each of the example entries 305 of FIG. 3 includes a test results field 325. Each of the example test results fields 325 of FIG. 3 contains the diagnostic test results associated with the subscriber loop 125, 126 represented by the corresponding identifier field 310.

To store the identified maintenance associated with the diagnostic test results, each of the example entries 305 of FIG. 3 includes an identified maintenance field 330. Each of the example identified maintenance fields 330 of FIG. 3 contains identified maintenance associated with the subscriber loops 125-126 represented by the corresponding identifier field 310, where the identified maintenance could suggest that the technician investigate a particular fault (e.g. short).

While an example maintenance report 300 that may be generated and/or presented by the example crosstalk analyzer 160 of FIG. 1 is illustrated in FIG. 3, the example maintenance report 300 may be implemented using any number and/or type(s) of other and/or additional entries, fields and/or data. Further, the entries, fields and/or data illustrated in FIG. 3 may be combined, divided, re-arranged, eliminated and/or implemented in any way. Further still, a maintenance report may include entries, fields and/or data in addition to, or instead of, those illustrated in FIG. 3, and/or may include more than one of any or all of the illustrated entries, fields and/or data.

Returning to FIG. 1, to manage maintenance reports, the example vectored DSL system 100 of FIG. 1 includes the example maintenance system 175. The example maintenance system 175 of FIG. 1 implements any number and/or type(s) of APIs via which the example crosstalk analyzer 160 can submit a maintenance report. The example maintenance system 175 also routes a submitted maintenance report to a suitable repair, customer support and/or technical support person for resolution, and tracks the resolution of maintenance reports.

While an example vectored DSL system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example AMS 155, the example DSL performance database 140, the example crosstalk analyzer 160, the example trouble ticket system 170, the example test equipment 165 and/or the example maintenance system 175 of FIG. 1 may be implemented by hardware, software, firmware and/or any combination of hardware, software and/or firmware. Thus, for example, any of the example AMS 155, the example DSL performance database 140, the example crosstalk analyzer 160, the example trouble ticket system 170, the example test equipment 165 and/or the example maintenance system 175 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, the vectored DSL system 100 may include interfaces, data structures, elements, processes and/or devices instead of, or in addition to, those illustrated in FIG. 1 and/or may include more than one of any or all of the illustrated interfaces, data structures, elements, processes and/or devices.

Figure 4:
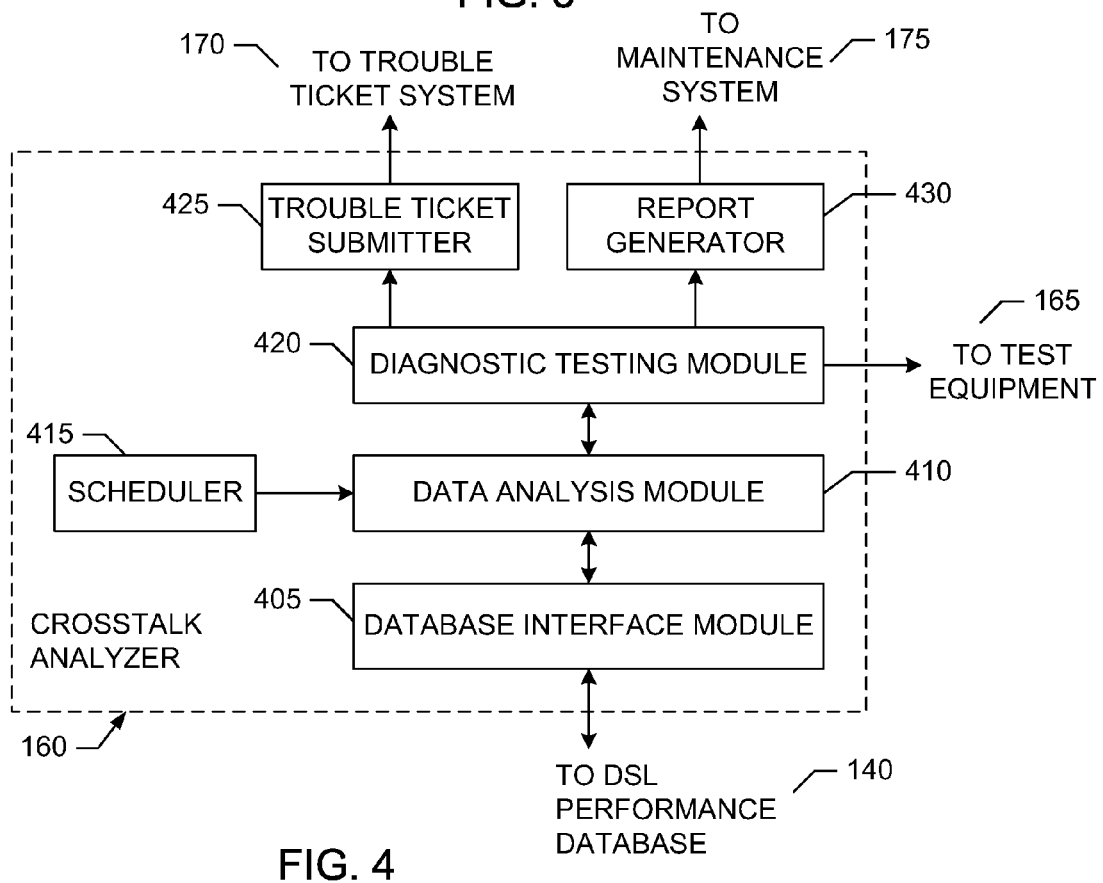
FIG. 4 illustrates an example manner of implementing the example crosstalk analyzer of FIG. 1.

FIG. 4 illustrates an example manner of implementing the example crosstalk analyzer 160 of FIG. 1. To interact with the example DSL performance database 140, the example crosstalk analyzer 160 of FIG. 4 includes a database interface module 405. The example database interface module 405 of FIG. 4 implements any number and/or type(s) of customized and/or specific interfaces implemented by the example DSL performance database 140 to enable the crosstalk analyzer 160 to query and/or obtain crosstalk coupling values.

To analyze the crosstalk coupling between the example subscriber loops 125-126, the example crosstalk analyzer 160 of FIG. 4 includes a data analysis module 410. Based on the crosstalk coupling values obtained from the example DSL performance database 140 via the database interface module 405, the example data analysis module 410 of FIG. 4 automatically determines whether additional diagnostic testing, trouble shooting, and/or maintenance should be performed for a particular subscriber loop 125, 126. For a presently considered subscriber loop 125, 126, the example data analysis module 410 of FIG. 4 queries, via the example database interface module 405, the example DSL performance database 140 to obtain the values that represent the crosstalk coupling between that subscriber loop 125, 126 and other subscriber loops belonging to the same vectored DSL group as the subscriber loop 125, 126. Based on the crosstalk coupling values, the example data analysis module 410 of FIG. 4 determines whether one or more diagnostic tests should be performed on the presently considered subscriber loop 125, 126. An example process that may be carried out to implement the data analysis module 410 is described below in connection with FIG. 5.

To initiate proactive subscriber loop analysis, the example crosstalk analyzer 160 of FIG. 4 includes any type of scheduler 415. Based on any number and/or type(s) of criteria, the example scheduler 415 of FIG. 4 periodically or aperiodically directs the example data analysis module 410 to analyze the crosstalk coupling between the subscriber loops 125-126. For example, the example scheduler 415 could initiate crosstalk analysis on a daily, a weekly and/or a monthly basis. Additionally and/or alternatively, operation of the example data analysis module 410 may be triggered by, for example, a person associated with the example maintenance system 175.

To execute diagnostic testing on the example subscriber loops 125-126, the example crosstalk analyzer 160 of FIG. 4 includes a diagnostic testing module 420. Based on the analysis performed by the data analysis module 410, the example diagnostic testing module 420 directs the test equipment 165 to perform a diagnostic test on the presently considered subscriber loop 125, 126. Example diagnostic tests that may be performed by the test equipment 165 include, but are not limited to, a metallic loop test (MLT), a single-ended line test (SELT), a dual-ended line test (DELT), or any other diagnostic test. The example diagnostic testing module 420 analyzes the results of the diagnostic test(s) performed by the test equipment 165 to determine whether the presently considered subscriber loop 125, 126 potentially requires trouble shooting and/or maintenance, where the identified maintenance could suggest that the technician investigate a particular fault (e.g. short).

To interact with the example trouble ticket system 170 of FIG. 1, the example crosstalk analyzer 160 of FIG. 4 includes a trouble ticket submitter 425. The example trouble ticket submitter 425 of FIG. 4 generates and submits a trouble ticket, such as, for example, the example trouble ticket 200 of FIG. 2, for the presently considered subscriber loop 125, 126 that was identified by the example diagnostic testing module 420. The example trouble ticket submitter 425 submits a trouble ticket by, for example, accessing and/or utilizing an API provided and/or implemented by the example trouble ticket system 170.

To generate maintenance reports, the example crosstalk analyzer 160 of FIG. 4 includes a report generator 430. Based on test results associated with subscriber loops 125-126 and any other subscriber loops in the vectored DSL group, the example report generator 430 of FIG. 4 creates a maintenance report, such as the example maintenance report 300 of FIG. 3. The example report generator 430 creates a list of subscriber loops, including subscriber loops 125-126, potentially requiring troubleshooting and/or maintenance based upon the diagnostic test results collected by the example diagnostic testing module 420. The maintenance report may be presented and/or accessed by the example maintenance system 175 of FIG. 1 via, for example, a web-based GUI and/or a web-based dashboard.

While an example manner of implementing the example crosstalk analyzer 160 of FIG. 1 has been illustrated in FIG. 4, one or more of the elements, processes, and/or devices illustrated in FIG. 4 may be combined, divided, re-arranged, omitted, eliminated, and/or implemented in any other way. Further, the example database interface module 405, the example data analysis module 410, the example scheduler 415, the example diagnostic testing module 420, the example trouble ticket submitter 425, the example report generator 430, and/or, more generally, the example crosstalk analyzer 160 could be implemented by one or more circuit(s), programmable processor(s), ASIC(s), PLD(s) and/or FPLD(s), etc. When any of the appended apparatus claims are read to cover a purely software and/or firmware implementation, at least one of the example database interface module 405, the example data analysis module 410, the example scheduler 415, the example diagnostic testing module 420, the example trouble ticket submitter 425, and/or the example report generator 430 are hereby expressly defined to include a tangible article of manufacture, such as a tangible computer readable medium storing the software and/or firmware. Further still, the example crosstalk analyzer 160 of FIG. 4 may include one or more elements, processes, and/or devices in addition to, or instead of, those illustrated in FIG. 4, and/or may include more than one of any or all of the illustrated elements, processes, and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 6. As used herein, the term non-transitory computer-readable medium is expressly defined to include any type of computer-readable medium and to exclude propagating signals.

Figure 5:
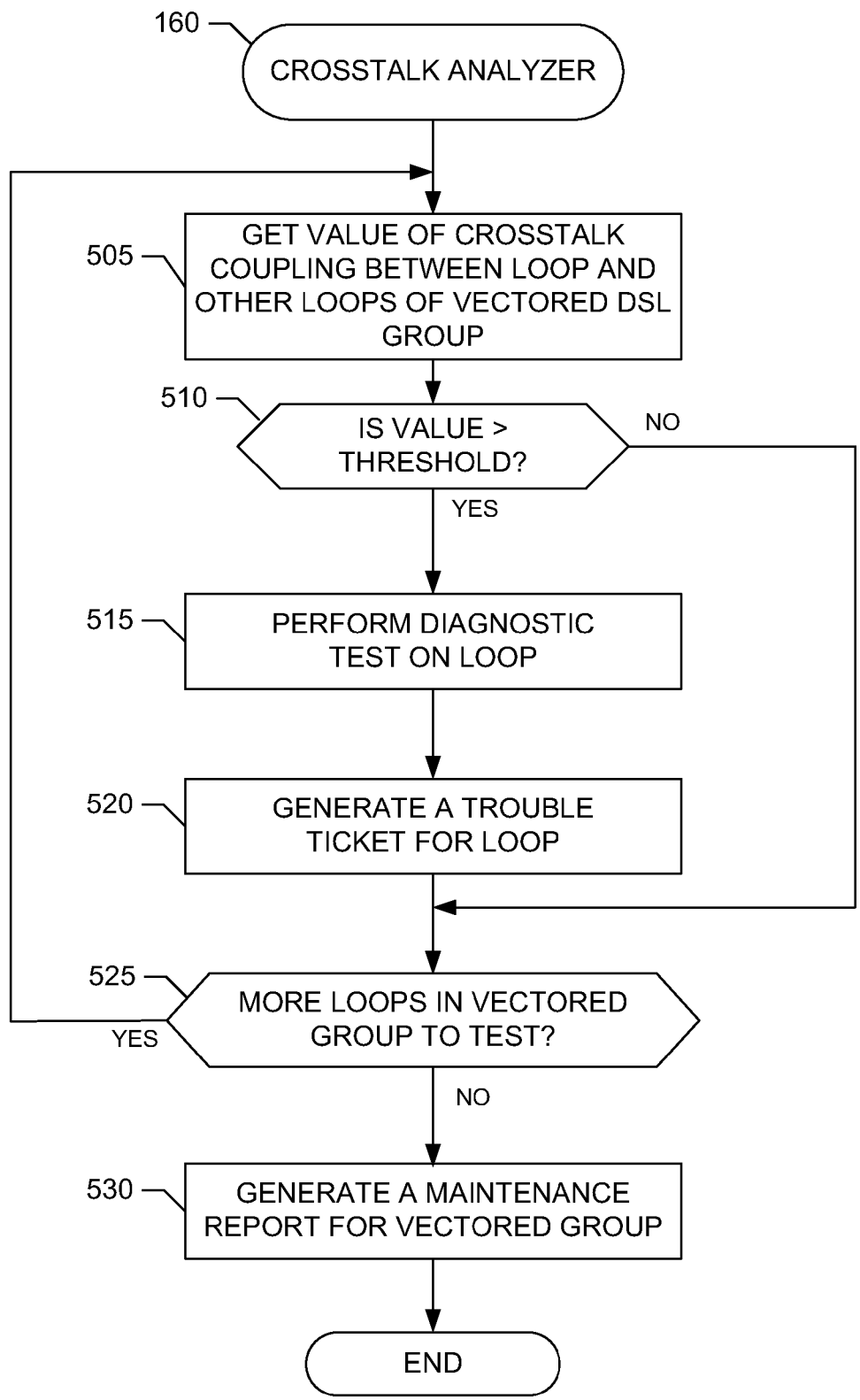
FIG. 5 is a flowchart representative of an example process that may be, for example, embodied in machine-accessible instructions that may be executed by a processor implement the example crosstalk analyzers of FIGS. 1 and 4.

FIG. 5 is a flowchart representing an example process that may be embodied as machine-accessible instructions and executed by, for example, one or more processors to allocate ports to vectored DSL groups and provision a vectored DSL service. A processor, a controller and/or any other suitable processing device may be used, configured and/or programmed to perform the example process of FIG. 5. For example, the process of FIG. 5 may be embodied in coded instructions stored on a tangible computer-readable medium.

Machine-readable instructions comprise, for example, instructions that cause a processor, a computer and/or a machine having a processor to perform one or more particular processes. Alternatively, some or all of the example process of FIG. 5 may be implemented using any combination(s) of ASIC(s), PLD(s), FPLD(s), FPGA(s), fuses, discrete logic, hardware, firmware, etc. Also, some or all of the example process of FIG. 5 may be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, the blocks of any or all of the example process of FIG. 5 may be carried out sequentially and/or carried out in parallel by, for example, separate processing threads, processors, devices, discrete logic, circuits, etc.

The example process of FIG. 5 begins with the example data analysis module 410 of FIG. 4 obtaining from the example DSL performance database 140 via the example database interface module 405 values that represent the crosstalk coupling between a presently considered subscriber loop 125, 126 and other subscriber loops belonging to the same vectored DSL group as the subscriber loops 125-126 (block 505). Based on the crosstalk coupling values, the example crosstalk analyzer 160 determines whether one or more diagnostic tests should be performed on the presently considered subscriber loop 125 (block 510). If the crosstalk coupling values are greater than a threshold (block 510), the diagnostic testing module 420 directs the test equipment 165 to perform one or more diagnostic tests on the presently considered subscriber loop 125 (block 515). The example trouble ticket submitter 425 of FIG. 4 generates and submits a trouble ticket, such as the example trouble ticket 200 of FIG. 2, for the presently considered subscriber loop 125 (block 520).

If crosstalk coupling analysis is required on additional subscriber loops in the vectored DSL group (block 525), control returns to block 505 to analyze the crosstalk coupling between the next subscriber loop and other loops of the vectored DSL group. If there are no additional subscriber loops in the vectored DSL group to analyze (block 525), control proceeds to block 530.

The example report generator 430 of FIG. 4 generates a maintenance report and/or web-based dashboard, such as the example maintenance report 300 of FIG. 3, for the subscriber loops 125-126 and any other subscriber loops tested by the diagnostic testing module 420 (block 530) to identify the subscriber loops potentially requiring trouble shooting and/or maintenance. Control then exits from the example process of FIG. 5.

Returning to block 505, if the crosstalk coupling values are not indicative of a fault (block 505), control proceeds to block 525.

Figure 6:
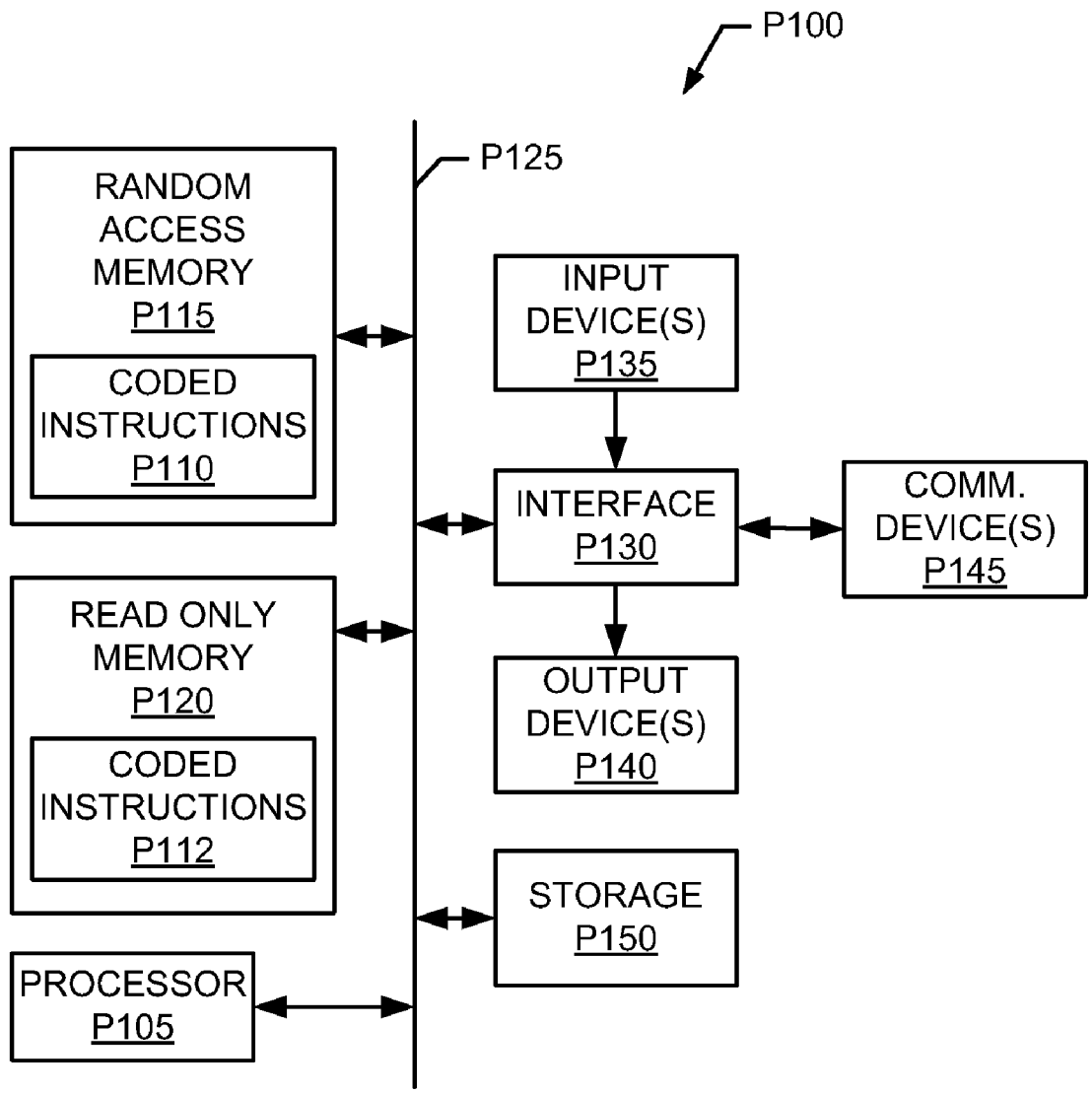
FIG. 6 is a schematic illustration of an example processor platform that may be used and/or programmed to carry out the example process of FIG. 5, and/or to implement any or all of the methods and apparatus disclosed herein.

FIG. 6 is a block diagram of an example processor platform P100 capable of executing the instructions of FIG. 5 to implement the example crosstalk analyzer of FIGS. 1 and 4. The processor platform P100 can be, for example, a server, a personal computer, an Internet appliance, a set top box, or any other type of computing device containing a processor.

The processor platform P100 of the instant example includes at least one processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIG. 5 to implement the example crosstalk analyzer of FIGS. 1 and 4.

The processor P105 is in communication with the main memory including the volatile memory P115 and the non-volatile memory P120, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory (RAM) device. The non-volatile memory P120 may be implemented by flash memory and/or any other type of memory device. Access to the main memory P115, P120 is typically controlled by a memory controller.

The processor platform P100 also includes an interface circuit P130. The interface circuit P130 may be implemented by any type of interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint, and/or a voice recognition system.

One or more output devices P140 can be implemented, for example, by display devices (e.g., a liquid crystal display, a cathode ray tube display (CRT), a printer and/or speakers). The interface circuit P130, thus, typically includes a graphics driver card.

The interface circuit P130 also includes a communication device (e.g., P145) such as a modem or network interface card to facilitate exchange of data with external computers via a network (e.g., an Ethernet connection, a DSL, a telephone line, coaxial cable, a cellular telephone system, etc.).

The processor platform P100 also includes one or more storage devices P150 for storing software and/or data. Example storage devices P150 include floppy disk drives, hard drive disks, compact disc (CD) drives, digital versatile disk (DVD) drives and/or any other solid-state, magnetic and/or optical storage devices. The example storage devices P150 may be used to, for example, store the example coded instructions of FIG. 5. The storage devices P150 may implement a local storage device.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    obtaining a value representing crosstalk coupling between a first subscriber loop and a second subscriber loop, the first and second subscriber loops belonging to a vectored group of subscriber loops;
    determining whether to automatically perform a diagnostic test on the first subscriber loop based on the value; and
    submitting a trouble ticket for the first subscriber loop based on a result of the diagnostic test.

2. A method as defined in claim 1, wherein the vectored group comprises a plurality of vectored digital subscriber loops contained in a same cable binder.

3. A method as defined in claim 1, wherein determining whether to automatically perform the diagnostic test on the first subscriber loop based on the value by comparing the value to a threshold.

4. A method as defined in claim 3, wherein the threshold comprises a value representing an allowable crosstalk coupling.

5. A method as defined in claim 1, wherein the submitted trouble ticket identifies that the first subscriber loop is to be investigated by a technician.

6. A method as defined in claim 1, further comprising determining whether to automatically perform a second diagnostic test on a third subscriber loop of the vectored group based on the result of the diagnostic test.

7. A method as defined in claim 6, further comprising submitting a second trouble ticket for the third subscriber loop based on a second result of the second diagnostic test.

8. A method as defined in claim 6, wherein the second submitted trouble ticket identifies that the third subscriber loop is to be investigated by a technician.

9. A method as defined in claim 1, further comprising generating a maintenance report for the vectored group based on the value and the result.

10. A method as defined in claim 1, wherein the diagnostic test comprises at least one of a metallic loop test (MLT), a single-ended line test (SELT), or a dual-ended line test (DELT).

11. An apparatus comprising:
a data analysis module to determine whether to automatically initiate a diagnostic test on a first subscriber loop based on a value representing crosstalk coupling between the first subscriber loop and a second subscriber loop, the first and second subscriber loops belonging to a vectored group of subscriber loops;
a diagnostic testing module to implement the diagnostic test; and
a trouble ticket submitter to submit a trouble ticket for the first subscriber loop based on a result of the diagnostic test.

12. An apparatus as defined in claim 11, further comprising a report generator to generate a maintenance report for the vectored group based on the value and the result.

13. An apparatus as defined in claim 11, wherein the data analysis module is to determine whether to initiate the diagnostic test by comparing the value to a threshold.

14. An apparatus as defined in claim 11, wherein the diagnostic test comprises at least one of a metallic loop test (MLT), a single-ended line test (SELT), or a dual-ended line test (DELT).

15. An article of manufacture storing machine-accessible instructions that, when executed, cause a machine to at least:
obtain a value representing crosstalk coupling between a first subscriber loop and a second subscriber loop, the first and second subscriber loops belonging to a vectored group of subscriber loops;
determine whether to automatically perform a diagnostic test on the first subscriber loop based on the value; and
submit a trouble ticket for the first subscriber loop based on a result of the diagnostic test.

16. An article of manufacture as defined in claim 15, wherein the machine-accessible instructions, when executed, cause the machine to determine whether to automatically perform the diagnostic test on the first subscriber loop based on the value by comparing the value to a threshold.

17. An article of manufacture as defined in claim 16, wherein the threshold comprises a value representing an allowable crosstalk coupling.

18. An article of manufacture as defined in claim 15, wherein the submitted trouble ticket identifies that the first subscriber loop is to be investigated by a technician.

19. An article of manufacture as defined in claim 15, wherein the machine-accessible instructions, when executed, cause the machine to determine whether to automatically perform a second diagnostic test on a third subscriber loop of the vectored group based on the result of the diagnostic test.

20. An article of manufacture as defined in claim 19, wherein the machine-accessible instructions, when executed, cause the machine to submit a second trouble ticket for the third subscriber loop based on a second result of the second diagnostic test.

* * * * *